United States Patent
Smirl et al.

[11] Patent Number: 5,936,732
[45] Date of Patent: Aug. 10, 1999

[54] APPARATUS AND METHOD FOR CHARACTERIZING ULTRAFAST POLARIZATION VARYING OPTICAL PULSES

[76] Inventors: Arthur Smirl, 1020 Cherry La. Northwest, Iowa City, Iowa 52240; Rick P. Trebino, 425 Mulqueeny St., Livermore, Calif. 94550

[21] Appl. No.: 08/899,968

[22] Filed: Jul. 24, 1997

[51] Int. Cl.$^6$ ................................................. G01B 9/02
[52] U.S. Cl. ........................................ 356/346; 356/351
[58] Field of Search ........................................ 356/346, 351

[56] References Cited

U.S. PATENT DOCUMENTS

| | | | |
|---|---|---|---|
| 5,530,544 | 6/1996 | Trebino et al. | 356/345 |
| 5,684,586 | 11/1997 | Fortenberry et al. | 356/345 |
| 5,754,292 | 5/1998 | Kane et al. | 356/345 |

Primary Examiner—Robert H. Kim
Assistant Examiner—Andrew H. Lee
Attorney, Agent, or Firm—Brian Dodson; Timothy Evans

[57] ABSTRACT

Practical techniques are described for characterizing ultrafast potentially ultraweak, ultrashort optical pulses. The techniques are particularly suited to the measurement of signals from nonlinear optical materials characterization experiments, whose signals are generally too weak for full characterization using conventional techniques.

11 Claims, 2 Drawing Sheets

APPARATUS AND METHOD FOR CHARACTERIZING ULTRAFAST POLARIZATION VARYING OPTICAL PULSES

This invention was made with Government support under Contract DE-AC04-94DP85000 awarded by the U.S. Department of Energy. The Government has certain rights in the invention.

BACKGROUND

The present invention relates generally to the use of interferometry for characterization of polarization varying, potentially ultraweak (optical pulse energy $\epsilon < 10^{-9}$ joules) and/or ultrashort (optical pulse duration $\tau < 10^{-10}$ seconds) optical pulses, and, more particularly, to apparatus and methods for such characterization utilizing dual-channel spectral interferometry.

Advances in laser technology have required corresponding advances in optical diagnostic and characterization methods and apparatus. For example, as the width of the optical pulse enters the picosecond and sub-picosecond regime, the ability of conventional optoelectronic techniques, such as electrically recorded light-sensitive diodes or electronic streak cameras, to record and characterize such ultrashort pulses becomes quite limited.

In response, a class of purely optical "gating" techniques for measuring extremely short optical pulses has evolved. These techniques can be described as "auto correlation" or "cross correlation" techniques, wherein an optical reference pulse of known (or unknown) characteristics and controllable time delay is used, generally through nonlinear optical effects, to gate an unknown optical pulse. As the time delay is varied, different parts of the unknown optical pulse are allowed to pass through the apparatus. A rough measurement of the optical intensity vs. time can then be obtained by measuring the resulting pulse energy or delay, even when the pulse duration is shorter than the temporal resolution of the sensor. By varying the time delay, it is thereby possible to determine, for example, the approximate duration and relative average intensity of an unknown optical pulse.

Considerably more information resides in an optical pulse, however. An ultrashort laser pulse, rather than being monochromatic, is spread over a considerable spectral range. The extent of such spectral broadening is on the order of $\Delta\omega/\omega \sim 1/\omega\tau$, where $\Delta\omega$ is the width of the spectral range found in the optical pulse, $\omega$ is the average frequency of the optical pulse, and $\tau$ is the duration of the optical pulse. For example, if $\omega = 6 \times 10^{14}$ Hz (blue light) and $\tau = 10$ femtoseconds, then the fractional bandwidth $\Delta\omega/\omega$ is ~0.16. Such an optical pulse thus contains photons ranging in frequency (nominally) from $\sim 5 \times 10^{14}$ Hz (green) to $\sim 7 \times 10^{14}$ Hz (violet). Moreover, the frequency of the pulse can vary significantly throughout its duration.

This information concerning the pulse, that is, the pulse instantaneous frequency vs. time or more rigorously, the pulse phase vs. time, as well as the pulse intensity vs. time can be obtained by measuring instead the time-dependent spectrum of the optical pulse. A class of techniques that may be termed spectrally-sensitive gating techniques have been developed to make this information accessible. The basic idea is to measure the spectrum of an optically-gated pulse as a function of the time delay, thereby obtaining time-resolved spectral information describing the optical pulse. (See, e.g., U.S. Pat. No. 5,530,544, issued to Trebino and Delong, which is hereby incorporated by reference in its entirety.)

One approach to implementing spectrally-sensitive gating are frequency-resolved optical grating (FROG) based techniques, which are known to be capable of directly obtaining intensity and phase information concerning an ultrashort optical pulse. In the simplest form, an input light pulse is formed into a probe pulse. A gate pulse is provided (derived either from the probe pulse or from a separate beam) having a variable time delay relative to the probe pulse. The gate pulse and the probe pulse are then combined in a nonlinear medium to form a signal pulse representing the probe pulse characteristics at a time functionally related to the time delay of the gate pulse, thereby providing a series of temporal slices of the probe pulse. A spectrometer receives the output pulse to generate an intensity signal as a function of time delay and wavelength.

Numerous FROG-based techniques for characterizing optical pulses exist. The gate pulse can be time delayed with various values to provide a plot of signal intensity vs. wavelength and gate pulse time delay. Alternatively, the gate pulse and probe pulse can be propagated through the nonlinear element at an angle to output a signal having a linear range of gate pulse delay times vs. position that directly yields the plot of signal intensity vs. wavelength and gate pulse time delay on a single pulse without the need for a variable time delay. These and related techniques, and the procedures to recover the intensity and phase information from the time-dependent spectral information provided thereby, are well-known in the art.

Despite the rapid progress that FROG-based techniques have made in the ability to fully characterize ultrashort optical pulses, essentially no progress has occurred in extending these techniques to lower pulse energies. FROG and related techniques are dependent on nonlinear optical effects to produce the gating effect. Such techniques can only be used to characterize optical pulses of at least the nanojoule energy range.

Unfortunately, most ultrafast nonlinear-optical material-characterization experiments yield optical pulse energies of femtojoules or less. Currently, only the signal-pulse energy is usually measured in such experiments. However, significantly more material information is available if the signal pulse could be more completely characterized.

The application of spectral interferometry to this problem has resulted in an apparatus and method capable of measuring the intensity and phase of an almost arbitrarily weak coherent optical pulse. (Experimental characterization of pulses with energies in the $10^{-20}$ joule range has been carried out.) Simple interference techniques are used to measure the difference in amplitude and phase between the coherent optical pulse and a well-characterized optical reference pulse vs. frequency. (The optical reference pulse can be characterized using FROG-based techniques, or other methods known in the art.)

To date, spectral interferometry techniques such as described above have been intrinsically scalar in nature. Much additional information, however, can be found in the temporal dynamics of the polarization state of an optical pulse. For example, when a linearly polarized ultrashort optical pulse traverses an anisotropic nonlinear material, the emerging light is elliptically polarized, the polarization is rotated, and the polarization state changes in time from the front to the rear of the optical pulse. Measurement of the polarization state permits the simultaneous determination of the nonlinear birefringence and the dichroism of an anisotropic, nonlinear material.

Such measurements are also useful in the study and application of hot-state semiconductor dynamics. The polarization state of the ultrafast coherent four-wave mixing signal from semiconductors varies rapidly in time, and these variations provide new information concerning exciton-exciton interactions. Such "hot carrier" effects are of vital interest to GHz optoelectronics.

The present invention describes an apparatus and method for characterizing arbitrary ultraweak and/or ultrashort coherent optical signal pulses which overcomes the limitations of existing technologies. A technique based on spectral interferometry, but sensitive to the polarization state, is used to measure the frequency-domain phase difference between an optical signal pulse and a fully-characterized optical reference pulse. These measurements together yield a complete description of the time-dependent intensity, phase, and polarization behavior of the unknown ultraweak ultrashort optical signal pulse. Various embodiments and other features, aspects, and advantages of the present invention will become better understood with reference to the following description and appended claims.

SUMMARY OF THE INVENTION

We disclose an apparatus and method for characterizing an optical signal pulse, in which producing an interference signal between an unknown optical signal pulse and a fully characterized optical reference pulse, and measuring the intensity of said interference signal, the optical signal pulse, and the optical reference pulse as a function of frequency, allows determination of the phase of the optical signal pulse as a function of frequency. Polarization-resolved information can be obtained by repeating these measurements for various polarization components of the reference and signal pulses.

BRIEF DESCRIPTION OF THE ILLUSTRATIONS

DETAILED DESCRIPTION OF THE INVENTION

The present invention comprises apparatus and method for using spectral interferometry to characterize ultraweak, ultrashort optical pulses. The method is based on using interferometric techniques to measure the phase difference between a well-characterized optical reference pulse and an unknown optical signal pulse.

The key to the present invention is the measurement of the spectrum of the combination (typically through the action of a beamsplitter) of an optical signal pulse and an optical reference pulse. When these pulses overlap spatially, preferably collinearly, and are spectrally resolved, the resulting spectrum yields the difference in phase between the two pulses vs. frequency. If one is a reference pulse, whose phase vs. frequency relationship is known, then the unknown pulse phase vs. frequency relationship can be determined. The unknown pulse spectrum (intensity vs. frequency) can be obtained from the apparatus described herein.

Figure 1:
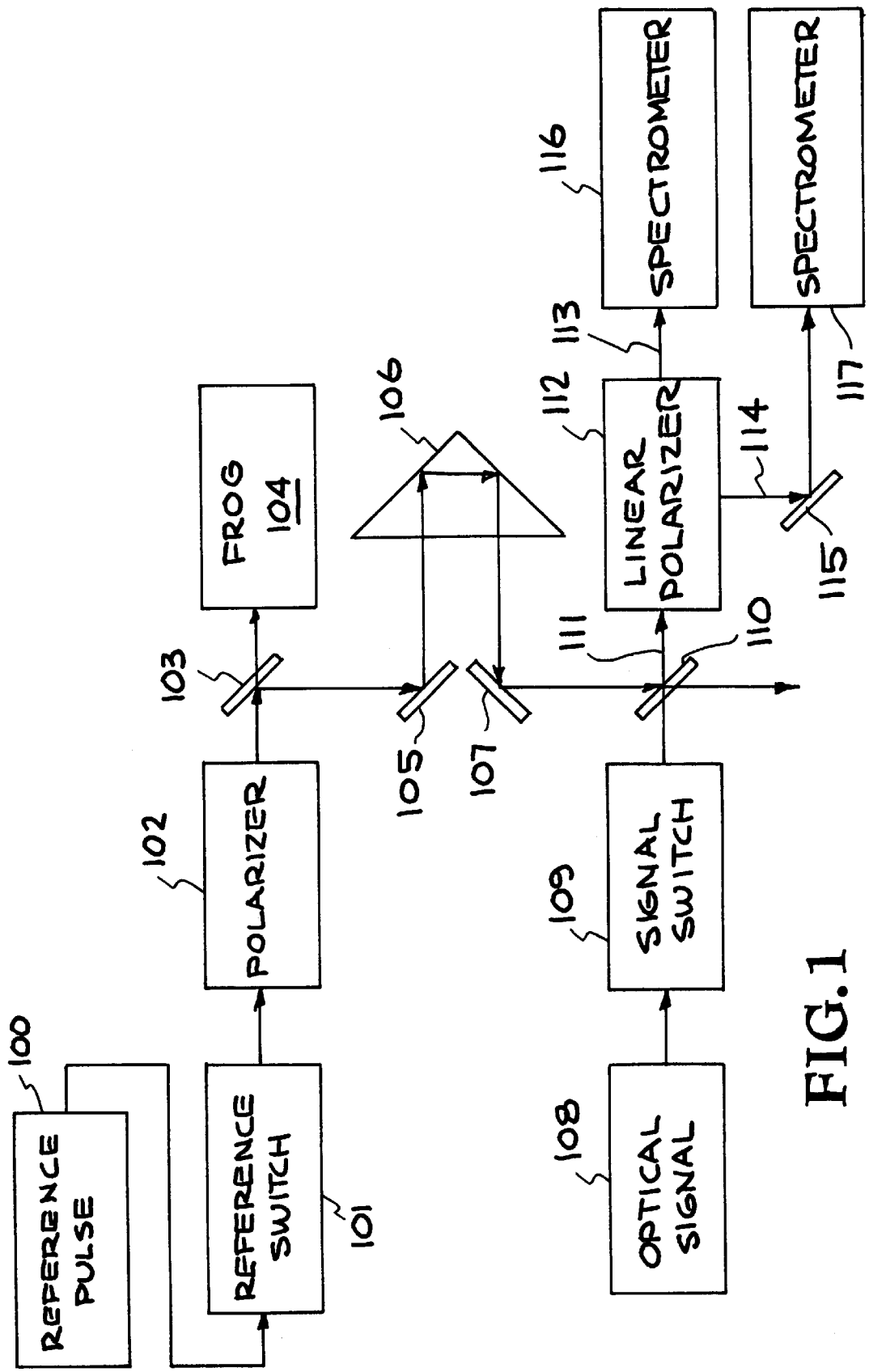
FIG. 1 shows a schematic drawing of an apparatus for polarization-resolved spectral interferometric characterization of ultraweak, ultrashort optical pulses.

FIG. 1 illustrates schematically the apparatus of the present invention for characterizing an optical pulse. Many of the details are specific only to this implementation, and are not intended to limit the scope of the claimed invention.

Optical reference pulse 100 is introduced into the apparatus through reference switch 101. Reference switch 101 is an optical switch which is closed when the intensity of optical signal pulse 108 alone is being measured. After passing through reference switch 101, optical reference pulse 100 is linearly polarized by the action of polarizer 102.

Reference pulse 100 then hits beamsplitter 103, which sends a portion of reference pulse 100 to a characterization apparatus 104. This is typically a FROG-based optical pulse analyzer, as described in U.S. Pat. No. 5,530,544, which is herein incorporated by reference. The intensity and phase behavior of the reference pulse 100 is thereby obtained.

The other portion of reference pulse 100 produced by beamsplitter 103 (this other portion shall still be called reference pulse 100) is then subjected to a time delay by the action of mirrors 105 and 107, and retroreflector 106. Varying the distance from the mirrors to the retroreflector varies the time delay.

Optical signal pulse 108 is now introduced into the apparatus through signal switch 109. Signal switch 109 is an optical switch which is closed when the spectrum of optical signal pulse 100 alone is being measured.

Optical switches 101 and 109 can use any switching technique that does not unduly degrade an optical pulse when the switch is open; i.e., the switches can be mechanical or non-mechanical in function, thus including electro-optic, magneto-optic, and acousto-optic switches. These switches need not be fast. In another implementation, optical switches 101 and 109 can be replaced with an optical blocking element which has at leas three positions: blocking the path of the optical signal pulse 108 alone, blocking the path of the optical reference pulse 100 alone, and blocking neither pulse.

After passing through signal switch 109, the optical signal pulse 108 and the optical reference pulse 100 are aligned coaxially by beamsplitter 110, resulting in an interference signal 111. This interference signal 111 is directed into linear polarizer 112, which splits interference signal 111 into a first polarization component 113 and a second polarization component 114. To maximize sensitivity of the apparatus, linear polarizer 112 is oriented so that the polarization axis is offset from that of polarizer 102 by 45°.

Polarization component 113 is now directed into first spectrometer 116, where the intensity of polarization component 113 as a function of frequency is measured. Polarization component 114 is directed by mirror 115 into second spectrometer 117, where the intensity of polarization component 114 as a function of frequency is measured. Note that although two spectrometers are used in this implementation, it is also possible to use a single spectrometer by displacing the first and second polarization components 113 and 114 along the entrance slit of a single spectrometer or one after the other in time if the pulse to be measured is repeatable.

One can use the above apparatus to measure all the information required to determine the intensity, phase, and polarization behavior of optical signal pulse 108. In describing the above implementation of the present invention, it is not intended to restrict the scope of the invention. The scope of the invention is intended to be set by the claims appended.

To further aid in understanding the operation of the present invention, the following discussion is provided. Spectral interferometry involves a spectrally resolved interference signal generated from an optical signal pulse and an optical reference pulse. When the pulses do not overlap in time, the intensity of the interference signal as a function of frequency exhibits fringes, that are due to the delay and phase difference between the optical reference pulse and the optical signal pulse. In particular, the interference signal is $$I_{int}(\omega)=I_r(\omega)+I_s(\omega)+2[I_r(\omega)I_s(\omega)]^{1/2}\cos[\phi_s(\omega)-\phi_r(\omega)-\omega\tau], \quad (1)$$

where $I_r(\omega)$ and $I_s(\omega)$ are the intensity spectra as a function of frequency ω of the optical reference pulse and the optical signal pulse, respectively, $\phi_r(\omega)$ and $\phi_s(\omega)$ are the phases of the reference and signal pulses, respectively, ω is the frequency, and τ is the time delay between the two pulses.

The only fundamental limitations of this invention are that the spectrum of the optical signal pulse must lie within that of the optical reference pulse and the delay must be no greater than the reciprocal of the spectrometer resolution (so that the interference fringe can be resolved). These conditions allow the interference of the two pulses. Note that the delay can be zero, but, in this case fringes are not necessarily observed and extraction of the relative phase vs. frequency relationship is more difficult. However, the inversion method described in Trebino and Delong (supra) may be used in this case.

To obtain the phase $\phi_s(\omega)$ characterization of the optical signal pulse requires that the other variables in Eq. 1 be obtained. The polarization information is not obtained at this point, so the polarizer 112 and the optical paths leading to spectrometers 116 and 117 are replaced by a single spectrometer, whose input receives interference signal 111.

The optical signal pulse intensity $I_s(\omega)$ can be measured as follows: Close optical switch 101, open optical switch 109, and measure the spectrum $I_s(\omega)$ as a function of the frequency of signal 111. The signal 111 exhibits no interference, as the optical reference pulse 100 is blocked by optical switch 101. Similarly, the optical reference pulse intensity $I_r(\omega)$ can be measured by opening optical switch 101 and closing optical switch 109.

The intensities $I_s(\omega)$ and $I_r(\omega)$ can also be independently measured, in which case optical switches 101 and 109 are unnecessary. However, the technique above allows the effect of all optical system losses and aberrations to be included automatically.

The intensity of the interference signal $I_{int}(\omega)$ is measured by opening both optical switches 101 and 109, thereby allowing the optical reference pulse and the optical signal pulse to interfere.

As the phase $\phi_r(\omega)$ is known for the optical reference pulse, the remaining unknown in equation 1 is the phase difference between the two pulses, $\phi_s(\omega)-\phi_r(\omega)-\omega\tau$. Equation 1 can be solved for this quantity using conventional fringe-inversion techniques. Such analysis also yields the relative delay term τ which need not be independently determined. Note that only one value of the delay is required in this measurement, unlike FROG-based methods which require a range of delays.

By determining the phase $\phi_r(\omega)$ of the optical reference pulse separately, e.g., using FROG-based pulse measuring techniques, the phase $\phi_s(\omega)$ of the optical signal pulse can be determined. The quantities $I_s(\omega)$ and $\phi_s(\omega)$ are in the frequency domain; to obtain the equivalent temporal-domain quantities $I_s(t)$ and $\phi_s(t)$ it is simply necessary to Fourier transform the frequency domain information.

Figure 2:
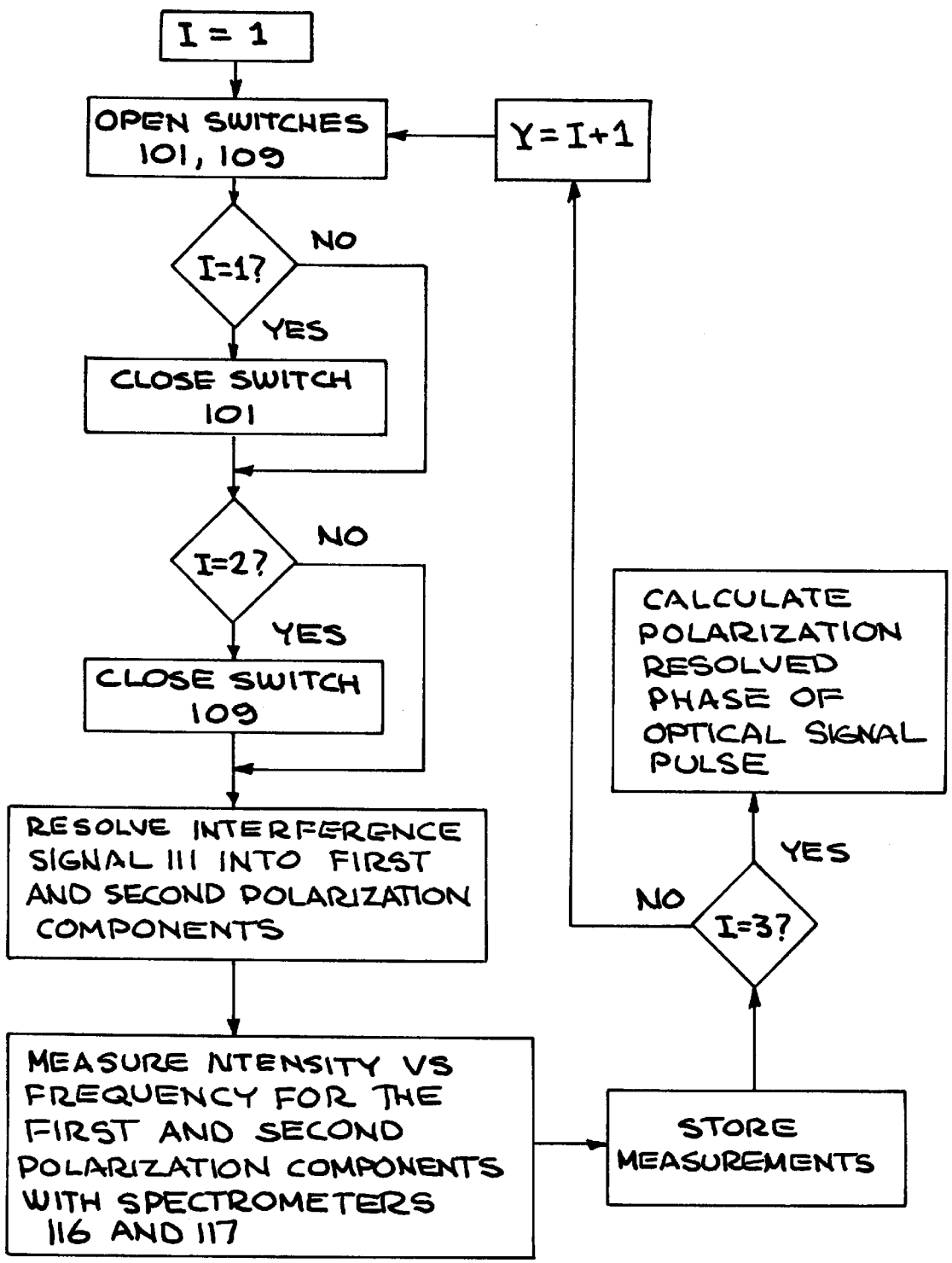
FIG. 2 shows a flowchart of an implementation of the method for using the apparatus in FIG. 1 for polarization-resolved spectral interferometric characterization of ultraweak, ultrashort optical pulses.

In order to obtain the time-dependent polarization-state information about the optical signal pulse, it is necessary to break both the optical signal pulse 108 and the optical reference pulse 100 into two distinct polarization components. The most straightforward choice is to decompose both pulses into orthogonal linearly polarized states (e.g., the x and y polarization components), but this is not required for the invention to function. The polarization components are chosen so that the optical reference pulse 100 has first and second polarization components with non-zero intensity. (One way of insuring this is to send reference pulse 100 through a linear polarizer whose polarization axis is oriented at 45° relative to the x and y directions. This is the most useful orientation for general analytical purposes.) The essential steps are summarized in the flow chart in FIG. 2.

The intensity of the first polarization component of the interference signal 113, $I^1_{int}(\omega)$, is found by directing the first polarization component of the interference signal 113 into first spectrometer 116, and measuring its intensity as a function of frequency. Similarly, the intensity of the second polarization component of the interference signal 114, $I^2_{int}(\omega)$, is found by directing the second polarization component of the interference signal 114 into second spectrometer 116, and measuring its intensity as a function of frequency.

The optical signal pulse 108 and the optical reference pulse 100 are characterized by measurement of the intensity of the first and second polarization components of the optical signal pulse alone, and of the optical reference pulse alone. The optical signal pulse 108 can be characterized by closing reference switch 101 while keeping signal switch 109 open, and measuring the intensity as a function of frequency using the first and second spectrometers 116 and 117, thus obtaining the intensities $I^1_s(\omega)$ and $I^2_s(\omega)$ of the two polarization components. The optical reference pulse 100 is characterized by opening shutter 101 while shutting shutter 109, and again measuring the intensity as a function of frequency using the first and second spectrometers 116 and 117, thereby obtaining the intensities $I^1_r(\omega)$ and $I^2_r(\omega)$.

Given the separate characterization of the polarization-resolved phase behavior of reference pulse 100 (i.e., $\phi^1_r(\omega)$ and $\phi^2_r(\omega)$), we now have sufficient information to obtain $I^1_s(\omega)$, $I^2_s(\omega)$, $\phi^1_s(\omega)$, and $\phi^2_s(\omega)$ by solution of equation 1, Fourier transforming each pulse into the time domain then yields the complete polarization-resolved intensity and phase behavior of the optical signal pulse.

When the polarization-resolved intensity and phase behavior of the optical signal pulse has been measured, a temporal-domain intensity and polarization ellipse of the optical signal pulse can be obtained as follows. Using transform techniques, calculate the time-dependent intensity and phase behavior for each polarization component of the optical signal pulse, yielding $I_s^1(t)$, $I_s^2(t)$, $\phi_s^1(t)$, and $\phi_s^2(t)$. The total intensity of the optical signal pulse is then $$I_s(t)=I_s^1(t)+I_s^2(t), \quad (2)$$

and the polarization ellipse is defined by the quantity $I^1_s(t)/I^2_s(t)$ and the phase difference $\phi^1_s(t)-\phi^2_s(t)$ in the conventional manner.

A useful aspect of the present invention is that it is based on a type of heterodyne technique, which can act to amplify an ultraweak signal pulse. If, for example, the reference pulse is chosen to be N times more intense than the signal pulse, the peak-to-peak variation in the fringes which must be measured to characterize the signal pulse are $4N^{1/2}$ times as intense as the spectrum of the signal pulse alone. Thus, a reference pulse 100 times as powerful as the signal pulse can be used, yielding fringes 40 times more visible than the signal pulse spectrum alone and easily seen against the background spectrum contributed by the reference pulse.

In the above we have described specific implementations of both apparatus and method for characterizing ultraweak, ultrafast polarization varying optical pulses. Numerous alternative implementations will be apparent to one skilled in the art. The above descriptions and discussion are not intended to restrict the scope of this invention. The scope of the invention is intended to be set by the claims appended.

We claim:

1. An apparatus for characterizing an optical signal pulse, comprising:
   i) means for measuring the intensity of the optical signal pulse and the intensity of an optical reference pulse as a function of wavelength;
   ii) means for measuring the phase of an optical reference pulse as a function of wavelength;
   iii) means for producing an interference signal from the optical reference pulse and the optical signal pulse;
   iv) means for separating the interference signal into a first polarization component and a second polarization component; and,
   v) spectrometer means for measuring the intensity of the first and second polarization components as a function of frequency.

2. The apparatus of claim 1, wherein the means for measuring the phase of an optical reference pulse comprise a frequency-resolved optical grating-based optical pulse characterizer.

3. The apparatus of claim 1, wherein the means for producing an interference signal from the reference pulse and the signal pulse comprise a beamsplitter.

4. The apparatus of claim 1, wherein the means for producing an interference signal from the reference pulse and the signal pulse comprise time delay optics.

5. The apparatus of claim 1, wherein the means for separating the interference signal into a first and a second polarization component comprises at least one optical polarization element.

6. The apparatus of claim 5, wherein at least one polarization element produces first and second polarization components having orthogonal polarization states.

7. The apparatus of claim 5, wherein the at least one polarization element is a linear polarizer.

8. The apparatus of claim 1, wherein said means for measuring the intensity of the optical signal pulse and the intensity of the optical reference pulse comprise an optical signal switch and an optical reference switch.

9. The apparatus of claim 1, wherein said means for measuring the intensity of the optical signal pulse and the intensity of the optical reference pulse comprise an optical blocking element, said element having a first position in which it blocks the optical signal pulse but not the optical reference pulse from the means for generating an interference signal, a second position in which it blocks the optical reference pulse but not the optical signal pulse from the means for generating an interference signal, and a third position in which it blocks neither pulse from the means for generating an interference signal.

10. A method for characterizing an optical signal pulse using a fully characterized optical reference pulse, comprising:
    i) separating the optical signal pulse into a first signal polarization component and a second signal polarization component;
    ii) separating the optical reference pulse into a first reference polarization component and a second reference polarization component, such that the first reference polarization component shares its polarization ellipse with the first signal polarization component and the second reference polarization component shares its polarization ellipse with the second signal polarization component;
    iii) generating a first interference signal between the first signal polarization component and the first reference polarization component;
    iv) measuring the first interference signal as a function of frequency;
    v) generating a second interference signal between the second signal polarization component and the second reference polarization component; and,
    vi) measuring the intensity of the second interference signal as a function of frequency.

11. The method of claim 10, further comprising:
    i) blocking the optical signal pulse;
    ii) measuring the intensity of the optical reference pulse as a function of frequency;
    iii) unblocking the optical signal pulse;
    iv) blocking the optical reference pulse; and,
    v) measuring the intensity of the optical signal pulse as a function of frequency.

* * * * *